United States Patent
Chen

(10) Patent No.: US 9,479,485 B2
(45) Date of Patent: Oct. 25, 2016

(54) NETWORK SECURITY METHOD AND NETWORK SECURITY SERVO SYSTEM

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/664,931

(22) Filed: Mar. 23, 2015

(65) Prior Publication Data

US 2016/0156596 A1 Jun. 2, 2016

(30) Foreign Application Priority Data

Nov. 28, 2014 (TW) .............................. 103141410 A

(51) Int. Cl.
*H04L 29/06* (2006.01)
*H04L 29/08* (2006.01)

(52) U.S. Cl.
CPC ........... *H04L 63/0428* (2013.01); *H04L 67/32* (2013.01)

(58) Field of Classification Search
CPC ............... H04L 63/0428; H04L 67/32; H04L 43/0817; H04L 43/06; H04L 43/0811; H04L 43/12; H04L 63/0861; H04L 63/14; H04L 63/1408; H04L 67/31; G06F 19/3418; G06F 19/3431; G06F 11/3055; G06F 11/0751; G06F 11/3476; G06F 15/00; G06F 17/00; G06F 17/30702; G06F 21/56; G06F 3/015; G06F 11/2038; G06F 11/2043; G06F 11/22; G06F 11/3017; G06F 11/302; G06F 17/18; G06F 17/304; G06F 17/30551; G06F 21/32; G06F 21/55; G06F 21/552; G06F 21/562; G06F 21/566; G06F 3/011; G06F 3/016; G06F 9/46; G06F 9/5027
See application file for complete search history.

(56) References Cited

U.S. PATENT DOCUMENTS

| | | | | |
|---|---|---|---|---|
| 7,908,357 | B2 * | 3/2011 | Goranson | H04L 63/1425 709/223 |
| 2008/0133719 | A1 * | 6/2008 | Amitai | H04L 63/0209 709/221 |
| 2010/0074112 | A1 * | 3/2010 | Derr | H04L 41/12 370/232 |
| 2011/0299455 | A1 * | 12/2011 | Ordentlich | H04L 67/12 370/328 |
| 2012/0047378 | A1 * | 2/2012 | Etkin | H04W 52/0219 713/320 |
| 2013/0238619 | A1 * | 9/2013 | Hanaoka | G06F 17/30424 707/736 |
| 2013/0278414 | A1 * | 10/2013 | Sprigg | G08B 21/0453 340/539.12 |
| 2013/0328697 | A1 * | 12/2013 | Lundy | G08C 17/02 340/870.16 |
| 2014/0067920 | A1 | 3/2014 | Hsieh et al. | |
| 2015/0051847 | A1 * | 2/2015 | Angello | F01D 21/003 702/35 |

OTHER PUBLICATIONS

Chun-Wei Tsai, Chin-Feng Lai, Ming-Chao Chiang and Laurence T. Yang "Data mining for Internet of Things: a survey", IEEE Communications Surveys & Tutorials, vol. 16, No. 1, Feb. 2014 (First Quarter 2014), pp. 77-97.*

* cited by examiner

*Primary Examiner* — Catherine Thiaw
(74) *Attorney, Agent, or Firm* — Jianq Chyun IP Office

(57) ABSTRACT

A network security method and a network security servo system are provided. The method includes: decrypting a plurality of encrypted data points from an Internet of Things (IoT) device; aggregating the data points into a plurality of aggregated data points, wherein the plurality of aggregated data points form a plurality of data sets; retrieving a plurality of first centroid data points corresponding to the data sets, wherein the first centroid data points form a first core data set; retrieving a plurality of second centroid data points corresponding to the first core data set and a second core data set, wherein the second core data set corresponds to other IoT devices; determining whether the IoT device is in an anomaly state based on the second centroid data points; and isolating the IoT device to a specific virtual network when the IoT device is in the anomaly state.

6 Claims, 3 Drawing Sheets

NETWORK SECURITY METHOD AND NETWORK SECURITY SERVO SYSTEM

CROSS-REFERENCE TO RELATED APPLICATION

This application claims the priority benefit of Taiwan application serial no. 103141410, filed on Nov. 28, 2014. The entirety of the above-mentioned patent application is hereby incorporated by reference herein and made a part of this specification.

BACKGROUND OF THE INVENTION

1. Field of the Invention

The invention relates to a security method and a servo system, and more particularly, to a network security method and a network security servo system.

2. Description of Related Art

An Internet of Things (IoT) device generally has the characteristics of, for instance, low computing capability, low storage capacity, difficult to be patched, and low defense capability. Since most of the big data collected by the devices is not instantly processed by a conventional security intelligence and analytics (SIA) system, the other devices may also be in danger of being infected if one of the devices is infected by malware.

SUMMARY OF THE INVENTION

Accordingly, the invention provides a network security method and a network security servo system capable of providing network security function to an Internet of Things device, thereby preventing the Internet of Things device from a malicious cyber attack or stolen data.

The invention provides a network security method suitable for a network security servo system. The method includes: decrypting a plurality of encrypted data points from an Internet of Things (IoT) device; aggregating the data points into a plurality of aggregated data points, wherein the aggregated data points form a plurality of data sets; retrieving a plurality of first centroid data points corresponding to the data sets, wherein the first centroid data points form a first core data set; retrieving a plurality of second centroid data points corresponding to the first core data set and a second core data set, wherein the second core data set corresponds to other Internet of Things devices; determining whether the Internet of Things device is in an anomaly state based on the second centroid data points; and isolating the Internet of Things device to a specific virtual network when the Internet of Things device is in the anomaly state.

In an embodiment of the invention, the method further includes: encrypting a data and transmitting the encrypted data to the Internet of Things device when a data is to be transmitted to the Internet of Things device.

In an embodiment of the invention, the method further includes, when the encrypted data points belong to a compressed packet to be transmitted by the Internet of Things device to a target Internet of Things device: converting the compressed packet into a network packet having an Internet format, wherein the compressed packet corresponds to a canonical packet in the Internet of Things device; routing the network packet; and compressing the network packet and transmitting the compressed network packet to the target Internet of Things device.

In an embodiment of the invention, the step of aggregating the data points into aggregated data points includes: characterizing a plurality of successive data points as one of the aggregated data points.

In an embodiment of the invention, the step of determining whether the Internet of Things device is in an anomaly state based on the second centroid data points includes: executing a data stream cluster algorithm on the second centroid data points to determine whether a plurality of anomalous data points appeared in the second centroid data points; if yes, determining the Internet of Things device is in the anomaly state.

The invention provides a network security servo system, including an edge module, a hub module, and a transparent proxy module. The edge module is configured to decrypt a plurality of encrypted data points from an Internet of Things device; aggregate the data points into a plurality of aggregated data points, wherein the aggregated data points form a plurality of data sets; retrieve a plurality of first centroid data points corresponding to the data sets, wherein the first centroid data points form a plurality of first core data sets. The hub module is configured to retrieve a plurality of second centroid data points corresponding to the first core data sets and a second core data set, wherein the second core data set corresponds to other Internet of Things devices; determining whether the Internet of Things device is in an anomaly state based on the second centroid data points. When the Internet of Things device is in the anomaly state, the transparent proxy module isolates the Internet of Things device to a specific virtual network.

In an embodiment of the invention, when a data is transmitted to the Internet of Things device, the edge module encrypts the data and transmits the encrypted data to the Internet of Things device.

In an embodiment of the invention, the system further includes another edge module. When the encrypted data points belong to a compressed packet to be transmitted by the Internet of Things device to a target Internet of Things device controlled by the other edge module, the edge module converts the compressed packet into a network packet having an Internet format, wherein the compressed packet corresponds to a canonical packet in the Internet of Things device. The edge module, the hub module, and the transparent proxy module are configured to route the network packet to the other edge module. The other edge module compresses the network packet and transmits the compressed network packet to the target Internet of Things device.

In an embodiment of the invention, the edge module characterizes a plurality of successive data points as one of the aggregated data points.

In an embodiment of the invention, the hub module is configured to execute a data stream cluster algorithm on the second centroid data points to determine whether a plurality of anomalous data points appeared in the second centroid data points. If yes, the hub module determines the Internet of Things device is in the anomaly state.

Based on the above, under the premise that the Internet of Things device itself has weaker computing capability, the network security method and the network security servo system provided in the embodiments of the invention can provide network security function to the Internet of Things device via greater computing capability.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
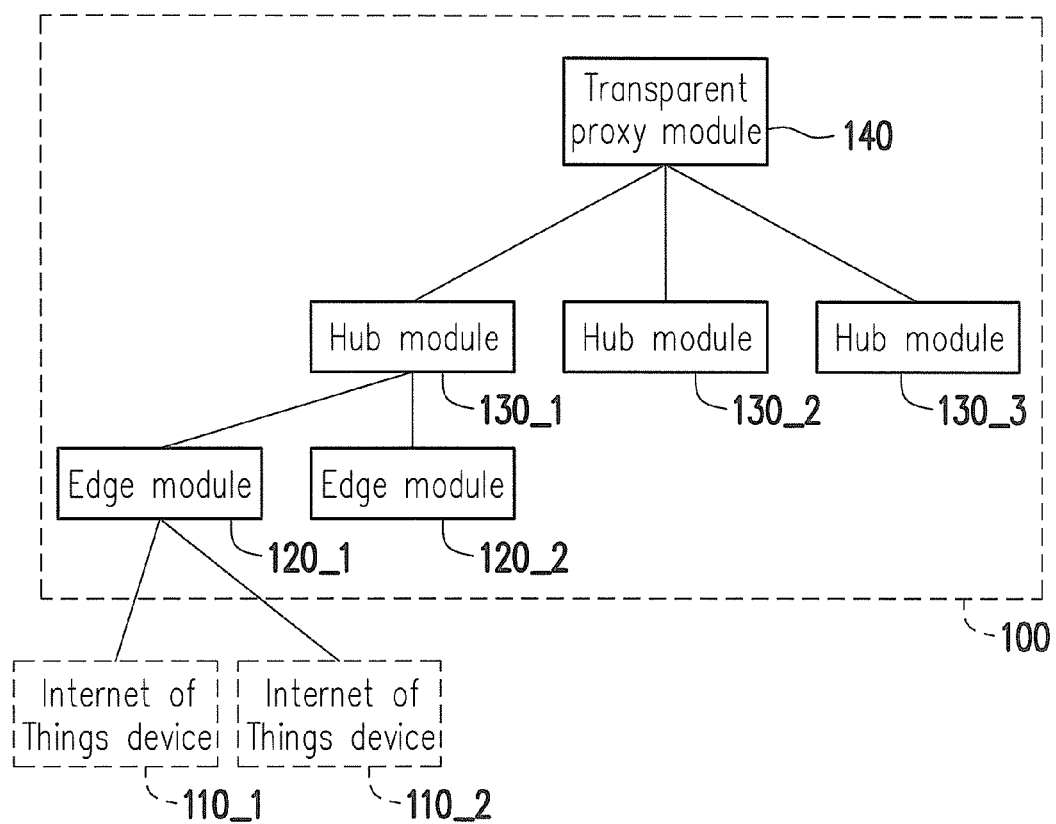
FIG. 1 is a schematic of a network security servo system illustrated according to an embodiment of the invention.

FIG. 1 is a schematic of a network security servo system illustrated according to an embodiment of the invention. In the present embodiment, a network security servo system 100 includes edge modules 120_1 to 120_2, hub modules 130_1 to 130_3, and a transparent proxy module 140. The network security servo system 100 is, for instance, a data center, a cloud server, or other similar server devices or server systems set up in a cloud network. The edge modules 120_1 to 120_2 are connected to and controlled by the hub module 130_1; the hub modules 130_1 to 130_3 are connected to and controlled by the transparent proxy module 140. The number of each module in FIG. 1 is only exemplary, and is not intended to limit the embodiments of the invention. Each module can be implemented as an individual physical device, or be set up on the network security servo system 100 in the form of a virtual machine, but the embodiments of the invention are not limited thereto.

In an embodiment, when the network security servo system 100 is implemented as a single cloud server, each module of FIG. 1 can be stored in a storage unit of the cloud server via a code method, and each module of FIG. 1 can be accessed and executed via a processing unit connected to the storage unit. The storage unit can be a memory, a hard disk, or any other device capable of storing data, and can be used to record a plurality of codes or modules. The processing unit can be a general-purpose processor, a special-purpose processor, a conventional processor, a digital signal processor, a plurality of microprocessors, one or a plurality of microprocessors combining digital signal processor cores, a controller, a microcontroller, an application-specific integrated circuit (ASIC), a field-programmable gate array (FPGA), any other types of integrated circuits, a state machine, a processor based on advanced RISC machine (ARM), and a similar product thereof.

The network security servo system 100 can be a software-defined network (SDN), and can provide network security function to the Internet of Things devices 110_1 to 110_2 based on the mechanism of security intelligence and analytics (SIA), thereby preventing a cyber attack or stolen data to the Internet of Things devices 110_1 to 110_2.

The Internet of Things devices 110_1 to 110_2 can respectively be a physical or virtual device having weaker computing capability and storage capacity, such as a temperature sensor, a health care device (such as a heart rate sensor, a blood pressure sensor, and a body temperature sensor), a smart water meter, or a smart meter. Since such devices have lower defense capability from a cyber attack and are in relatively large numbers (may reach billions), the network security function of the devices is not readily improved via a known patch method.

It should be understood that, since each module in FIG. 1 is set up in the cloud network, the computing capability and the storage capacity of each thereof are both higher than those of the conventional Internet of Things devices 110_1 to 110_2. Therefore, via the structure provided in the embodiment of FIG. 1, the device (or virtual machine) of, for instance, the edge module 120_1 can provide network security function to the Internet of Things devices 110_1 to 110_2 via greater computing capability and storage capacity. In this way, the network defense capabilities of the Internet of Things devices 110_1 to 110_2 can be effectively increased, and the network administrator can also perform patching (such as fixing security vulnerabilities or debugging) on the Internet of Things devices 110_1 to 110_2 more conveniently.

Taking the edge module 120_1 as an example, the edge module 120_1 can be used to process and manage all data about to be transmitted to the Internet of Things device 110_1 or 110_2. In an embodiment, before the edge module 120_1 transmits a first data to the Internet of Things device 110_1, the edge module 120_1 can firstly encrypt the first data and then transmit the encrypted first data to the Internet of Things device 110_1, so as to prevent the first data from being stolen during the transmission process. More specifically, since the process of the first data being sent to the Internet of Things device 110_1 is a less secure transmission process, after the edge module 120_1 performs encryption on the first data, the probability of the first data being successfully stolen can be effectively reduced.

From another perspective, after the edge module 120_1 performs is encryption on the first data and transmits the encrypted first data to the Internet of Things device 110_1 having lower computing capability, the Internet of Things device 110_1 can automatically perform encryption on the first data without the need to protect the first data. As a result, computational burden of the Internet of Things device 110_1 is reduced.

Moreover, when the network administrator intends to patch all Internet of Things devices controlled by the edge module 120_1, the network administrator only needs to patch the edge module 120_1 to achieve such effect, and does not need to individually patch all Internet of Things devices. In this way, the convenience of the network administrator in managing each Internet of Things device controlled by the edge module 120_1 can be increased.

Moreover, the network administrator can set up, for instance, a security policy such as a firewall rule and an access rule on the edge module 120_1 so as to control the security of data entering and leaving the Internet of Things device 110_1.

It should be mentioned that, in the case that each module in FIG. 1 is set up in the network security servo system 100 via a virtual machine method, when the number of the Internet of Things device is rapidly increased, the network administrator only needs to add corresponding virtual machines to readily manage the added Internet of Things devices. Therefore, the convenience of the network administrator in management can also be increased.

In an embodiment, when the Internet of Things device 110_1 is to transmit a plurality of sensed data points (such as temperature) to the edge module 120_1, the Internet of Things device 110_1 can transmit the data points to the edge module 120_1 after encrypting the data points. Then, when the edge module 120_1 receives the encrypted data points, the network security servo system 100 can perform the process shown in FIG. 2 to provide network security function to all Internet of Things devices.

Figure 2:
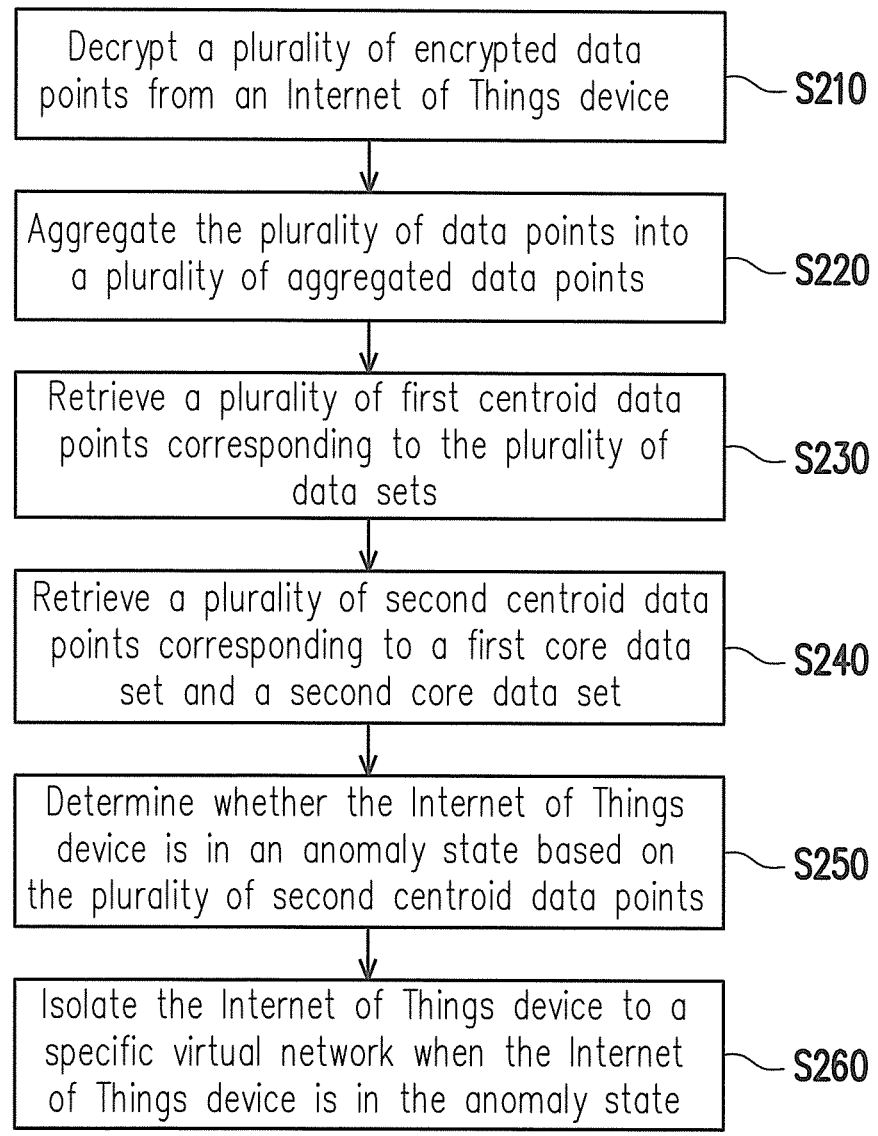
FIG. 2 is a network security method illustrated according to an embodiment of the invention.

FIG. 2 is a network security method illustrated according to an embodiment of the invention. The method of the present embodiment can be executed via each module shown in FIG. 1, and the details of the method are described with reference to each module and device of FIG. 1.

As mentioned above, when the edge module 120_1 receives a plurality of encrypted data points from the Internet of Things device 110_1, in step S210, the edge module 120_1 can decrypt a plurality of encrypted data points from the Internet of Things device 110_1. Then, in step S220, the edge module 120_1 can aggregate the plurality of data points into a plurality of aggregated data points, wherein the plurality of aggregated data points form a plurality of data sets. In an embodiment, the edge module 120_1 can characterize a plurality of successive data points as one of the plurality of aggregated data points. For instance, the edge module 120_1 can condense a plurality (such as ten) successive temperature values from the Internet of Things device 110_1 to one temperature value (that is, aggregated data point), thus reducing computational burden of the edge module 120_1. Then, in step S230, the edge module 120_1 can retrieve a plurality of first centroid data points corresponding to the plurality of data sets.

Figure 3:
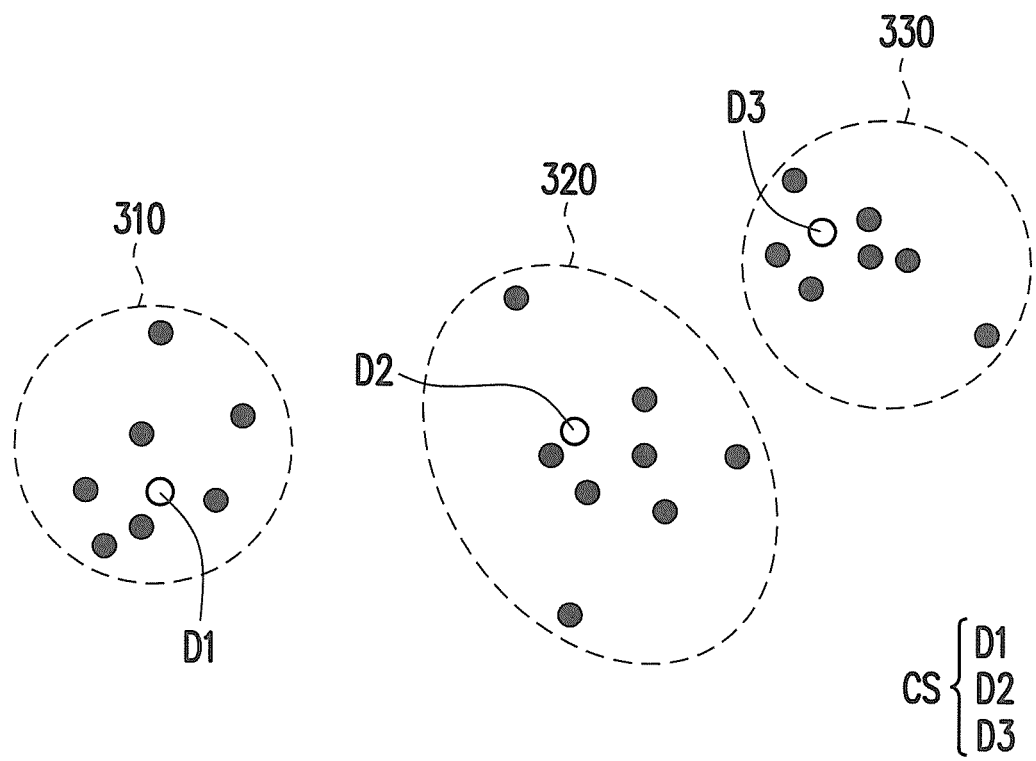
FIG. 3 is a schematic of retrieving first centroid data points from data sets illustrated according to an embodiment of the invention.

FIG. 3 is a schematic of retrieving first centroid data points from data sets illustrated according to an embodiment of the invention. In the present embodiment, in the case that each circle in FIG. 3 individually corresponds to one of a plurality of aggregated data points of the Internet of Things device 110_1, the aggregated data points can form data sets 310 to 330. In this case, the edge module 120_1 can individually retrieve first centroid data points D1 to D3 from the data sets 310 to 330, and the first centroid data points D1 to D3 can form a first core data set CS. In the present embodiment, the first centroid data point D1 is, for instance, the centroid of an aggregated data point in the data set 310; the first centroid data point D2 is, for instance, the centroid of an aggregated data point in the data set 320; the first centroid data point D3 is, for instance, the centroid of an aggregated data point in the data set 330.

After performing the operation shown in FIG. 3, the amount of computation of a subsequently executed network security function can be reduced. It should be mentioned that, since the edge module 120_2 can also retrieve a core data set (hereinafter second core data set) corresponding to other Internet of Things devices managed by the edge module 120_2, the hub module 130_1 can perform data reduction on the first core data set and the second core data set of the edge module 120_1 and the edge module 120_2, so as to further reduce the amount of computation of a subsequently executed network safety function.

Figure 4:
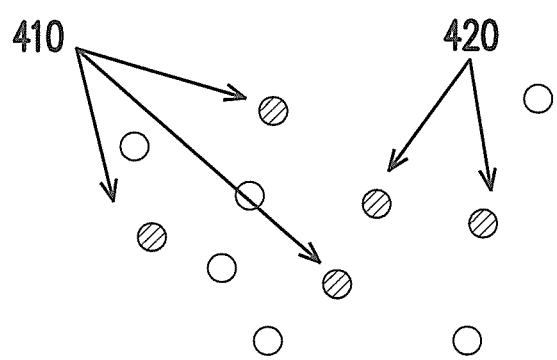
FIG. 4 is a schematic of retrieving second centroid data points from a first core data set and a second core data set illustrated according to an embodiment of the invention.

In step S240, the hub module 130_1 can retrieve a plurality of second centroid data points corresponding to the first core data set and the second core data set. FIG. 4 is a schematic of retrieving second centroid data points from a first core data set and a second core data set illustrated according to an embodiment of the invention. In the present embodiment, each circle represents a first core data point belonging to the first core data set and the second core data set, and the hub module 130_1 can find the second centroid data points 410 to 420 according to a similar mechanism shown in FIG. 3, the details of which are as described for FIG. 3, and would not be repeated herein.

Then, in step S250, the hub module 130_1 can determine whether the Internet of Things device 110_1 is in an anomaly state based on the plurality of second centroid data points. In an embodiment, the hub module 130_1 can execute a data stream cluster algorithm on the plurality of second centroid data points to instantly determine whether a plurality of anomalous data points appeared in the second centroid data points. If yes, then the hub module 130_1 can determine the Internet of Things device 110_1 is in the anomaly state. In an embodiment, when the Internet of Things device 110_1 is in the anomaly state, the Internet of Things device 110_1 can be referred to as an outlier. The data stream cluster algorithm is based on, for instance, density-based clustering algorithm, distribution-based clustering algorithm, centroid-based clustering algorithm, and connectivity-based clustering algorithm, but the embodiments of the invention are not limited thereto.

For instance, when the traffic of the Internet of Things device 110_1 is unusually high, the hub module 130_1 can correspondingly learn that the Internet of Things device 110_1 is in the anomaly state according to the conventional traffic benchmark of the Internet of Things device 110_1. As another example, when the usage amount of the random access memory (RAM) of the Internet of Things device 110_1 is unusually high, the hub module 130_1 can also correspondingly learn that the Internet of Things device 110_1 is in the anomaly state according to the conventional memory usage amount benchmark of the Internet of Things device 110_1.

In step S260, when the Internet of Things device 110_1 is in the anomaly state, the transparent proxy module 140 can isolate the Internet of Things device 110_1 to a specific virtual network. In an embodiment, the transparent proxy module 140 can call a network slicer to slice a physical network managed by the transparent proxy module 140 into a plurality of specific virtual networks (that is, network slices), and the transparent proxy module 140 can assign all Internet of Things devices having certain common characteristics to the same specific virtual network. For instance, all Internet of Things devices in a first specific virtual network are Internet of Things devices with traffic anomaly, and all Internet of Things devices in a second specific virtual network are Internet of Things devices with RAM usage amount anomaly, but the embodiments of the invention are not limited thereto. It should be mentioned that, each specific virtual network cannot perform any communication with one another. In other words, the transparent proxy module 140 can decide whether to assign or isolate the Internet of Things device 110_1 to a corresponding specific virtual network according to the anomaly state of the Internet of Things device 110_1 so as to prevent the Internet of Things device 110_1 from affecting other Internet of Things devices.

In an embodiment, when the plurality of encrypted data points from the Internet of Things device 110_1 belong to a compressed packet to be transmitted by the Internet of Things device 110_1 to a target Internet of Things device controlled by another edge module (such as edge module 120_2), the edge module 120_1 can convert the compressed packet to a network packet having an Internet format. The compressed packet corresponds to, for instance, a canonical packet in the Internet of Things device 110_1. Then, the edge module 120_1, the hub module 130_1, and the transparent proxy module 140 can route the network packet to the edge module 120_2, and the edge module 120_2 can compress the network packet and transmit the compressed network packet to the target Internet of Things device. After the target Internet of Things device receives the compressed network packet, the target Internet of Things device can restore the compressed network packet to the canonical packet so as to retrieve the information in the canonical packet.

Based on the above, under the premise that the Internet of Things device itself has weaker computing capability, the network security servo system provided in the embodiments of the invention can provide network security function to the Internet of Things device via greater computing capability. Moreover, in the case that an edge module is used, since the Internet of Things device does not need to perform encryption on received data again, computing burden of the Internet of Things device can be reduced.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A network security method, implemented in a network security servo system, comprising:
    decrypting a plurality of encrypted data points from a first Internet of Things device by a hardware processor executing instructions recorded in a storage device of the network security servo system;
    aggregating the data points into a plurality of aggregated data points by the hardware processor, wherein the aggregated data points form a plurality of data sets and the aggregating comprises characterizing a plurality of successive data points as one of the aggregated data points;
    retrieving a plurality of first centroid data points corresponding to the data sets by the hardware processor, wherein the first centroid data points form a first core data set;
    retrieving a plurality of second centroid data points corresponding to the first core data set and a second core data set by the hardware processor, wherein the second core data set corresponds to other Internet of Things devices;
    determining whether the first Internet of Things device is in an anomaly state based on the second centroid data points by the hardware processor, comprising:
        executing a data stream cluster algorithm on the second centroid data points to determine whether a plurality of anomalous data points appear in the second centroid data points by the hardware processor; and
        determining the first Internet of Things device is in the anomaly state by the hardware processor;
    and isolating the first Internet of Things device to a specific virtual network by the hardware processor when the first Internet of Things device is in the anomaly state, wherein the isolating prevents the other Internet of Things device from cyber attacks.

2. The method of claim 1, further comprising:
    encrypting a data and transmitting the encrypted data to the first Internet of Things device when transmitting a data to the first Internet of Things device by the hardware processor.

3. The method of claim 1, further comprising, when the encrypted data points belong to a compressed packet to be transmitted by the first Internet of Things device to a target Internet of Things device:
    converting the compressed packet into a network packet having an Internet format by the hardware processor, wherein the compressed packet corresponds to a canonical packet in the first Internet of Things device;
    routing the network packet by the hardware processor; and
    compressing the network packet to form a compressed network packet and transmitting the compressed network packet to the target Internet of Things device by the hardware processor.

4. A network security servo system, comprising:
    a storage device, configured to record a plurality of modules; and
    a processor, coupled to the storage device and configured to access and execute the modules recorded in the storage device, wherein the modules comprise:
        an edge module, configured to:
            decrypt a plurality of encrypted data points from a first Internet of Things device;
            aggregate the data points into a plurality of aggregated data points, wherein the aggregated data points form a plurality of data sets and the aggregating comprises characterizing a plurality of successive data points as one of the aggregated data points;
            retrieve a plurality of first centroid data points corresponding to the data sets, wherein the first centroid data points form a plurality of first core data sets;
        a hub module, configured to:
            retrieve a plurality of second centroid data points corresponding to the first core data sets and a second core data set, wherein the second core data set corresponds to other Internet of Things devices;
            determine whether the first Internet of Things device is in an anomaly state based on the second centroid data points, wherein the hub module is further configured to:
            execute a data stream cluster algorithm on the second centroid data points to determine whether a plurality of anomalous data points appear in the second centroid data points; and
            determine the first Internet of Things device is in the anomaly state; and
            isolate the first Internet of Things device to a specific virtual network via a transparent proxy module when the first Internet of Things device is in the anomaly state, wherein isolating the first Internet of Things device prevents the other Internet of Things device from cyber attacks.

5. The network security servo system of claim 4, wherein when transmitting a data to the first Internet of Things device, the edge module encrypts the data and transmits the encrypted data to the first Internet of Things device.

6. The network security servo system of claim 4, further comprising another edge module, wherein when the encrypted data points belong to a compressed packet to be transmitted by the first Internet of Things device to a target Internet of Things device controlled by the other edge module, the edge module converts the compressed packet into a network packet having an Internet format, wherein the compressed packet corresponds to a canonical packet in the first Internet of Things device, the edge module, the hub module, and the transparent proxy module are configured to route the network packet to the other edge module, and the other edge module compresses the network packet and transmits the compressed network packet to the target Internet of Things device.

* * * * *